United States Patent [19]

Loziuk

[11] Patent Number: 5,522,585
[45] Date of Patent: Jun. 4, 1996

[54] WIRE CABLE ISOLATOR AND ENERGY ABSORBING RESTRAINT

[76] Inventor: Lawrence A. Loziuk, 145 Midway La., Vernon Hills, Ill. 60061

[21] Appl. No.: 475,519

[22] Filed: Jun. 7, 1995

Related U.S. Application Data

[60] Division of Ser. No. 274,645, Jul. 13, 1994, Pat. No. 5,441,243, which is a continuation-in-part of Ser. No. 978, 018, Nov. 17, 1992, Pat. No. 5,360,210, which is a continuation-in-part of Ser. No. 915,477, Jul. 16, 1992, Pat. No. 5,240,232.

[51] Int. Cl.$^6$ .................................................. F16F 3/00
[52] U.S. Cl. ............................ 267/148; 248/570; 188/378
[58] Field of Search ..................................... 267/136, 148, 267/147, 149; 248/570, 526, 528, 901, 630, 638, 603; 188/378

[56] References Cited

U.S. PATENT DOCUMENTS

| | | | |
|---|---|---|---|
| 2,421,822 | 6/1947 | Wood | 248/54 |
| 3,204,911 | 9/1965 | Lawrence et al. | 248/358 |
| 4,190,227 | 2/1980 | Belfield et al. | 248/636 |
| 4,397,069 | 8/1983 | Camossi | 29/173 |
| 4,620,688 | 11/1986 | Khlafallah et al. | 248/542 |
| 4,783,038 | 11/1988 | Gilbert et al. | 248/570 |
| 4,835,856 | 6/1989 | Azami | 29/156.6 |
| 4,955,467 | 9/1990 | Kallenbach | 188/381 |
| 5,062,507 | 11/1991 | Roche | 267/148 |
| 5,240,232 | 8/1993 | Loziuk | 267/136 |
| 5,277,394 | 1/1994 | Slemmer | 248/570 |

FOREIGN PATENT DOCUMENTS

| | | | |
|---|---|---|---|
| 1634860 | 3/1991 | U.S.S.R. | 267/148 |

OTHER PUBLICATIONS

Drawing from U.S. Patent Application Ser. No. 07/068,580 or 088,580 (photocopy not legible) entitled Seismic Stop Pipe Support by Robert L. Cloud & Associates, Inc. (no date).

Article entitled "Reducing the Structural Response of a Floor Slab Subject to Flow Induced Pipe Vibration Using Wire Rope Isolators" by L. A. Loziuk, W. C. Maki, and H. LeKuch, presented at the 63rd Shock and Vibration Symposium, Oct. 26–30, 1992.

Article entitled "Reducing Pipe Vibration Using Wire Energy Absorbing Rope (Wear™) Restraints", by L. A. Loziuk and Rob Zandbergen, presented at the 1992 ASME Pressure Vessel and Pipe Conference, Jun. 21–25, 1992.

Article entitled "Controlling Pipe Vibration Using Wire Energy Absorbing Rope Pipe Restraints", by L. A. Loziuk, E. G. Berak and L. H. Ma, presented at the 1991 ASME Pressure Vessel and Pipe Conference, Jun. 23–27, 1991.

Article entitled "A Wire Rope Seismic Support" by L. A. Loziuk, presented at The 1986 Symposium on Current Issues Related to Nuclear Power Plant Structures, Equipment and Piping Dec. 10–12, 1986.

*Primary Examiner*—Mark T. Le
*Attorney, Agent, or Firm*—Dressler, Goldsmith, Shore & Milnamow, Ltd.

[57] ABSTRACT

A wire cable isolator and an associated energy absorbing restraint for connecting between a device subject to movement due to dynamic loads and possibly thermal deflection, and an adjacent structure, such as a building or a support member is disclosed. The isolator has predetermined, symmetrical force-deflection properties. The isolator includes first and second pairs of entrapment members, and a wire cable formed in a spiral. The first pair of entrapment members clamp the wire cable spiral at opposite side of the spiral and the second pair of entrapment members clamp the wire cable spiral at opposite sides of the spiral. The first and second pair of entrapment members are disposed at predetermined positions about an exterior periphery of the spiral.

21 Claims, 3 Drawing Sheets

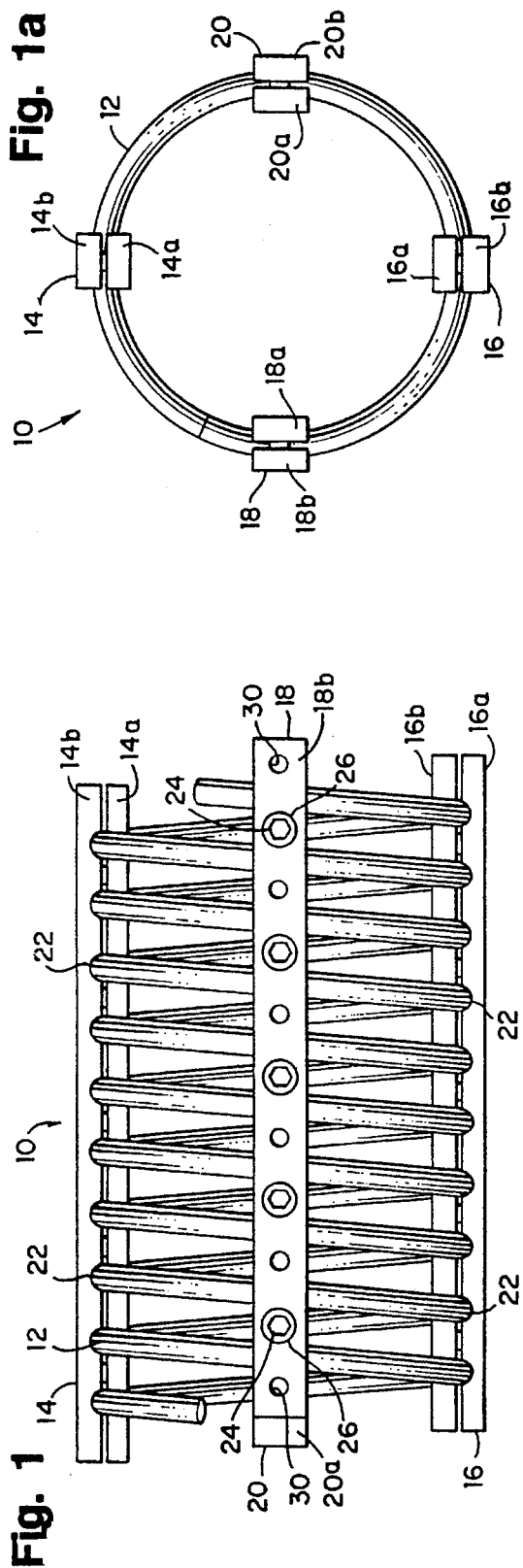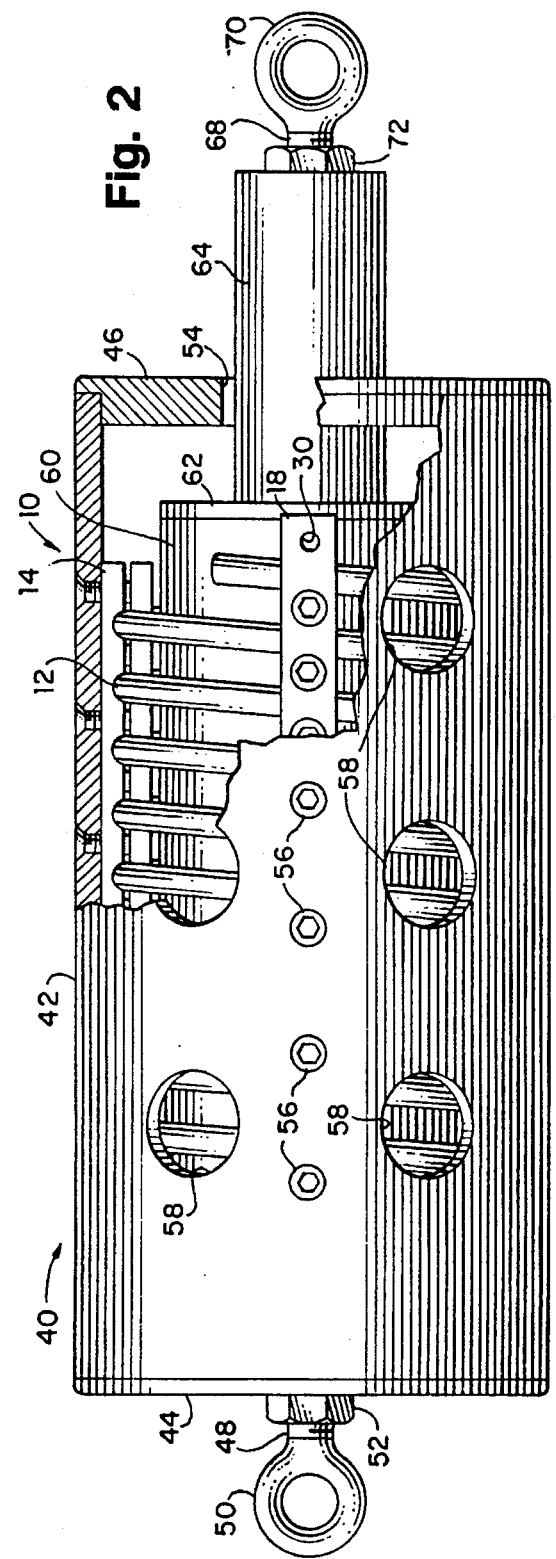

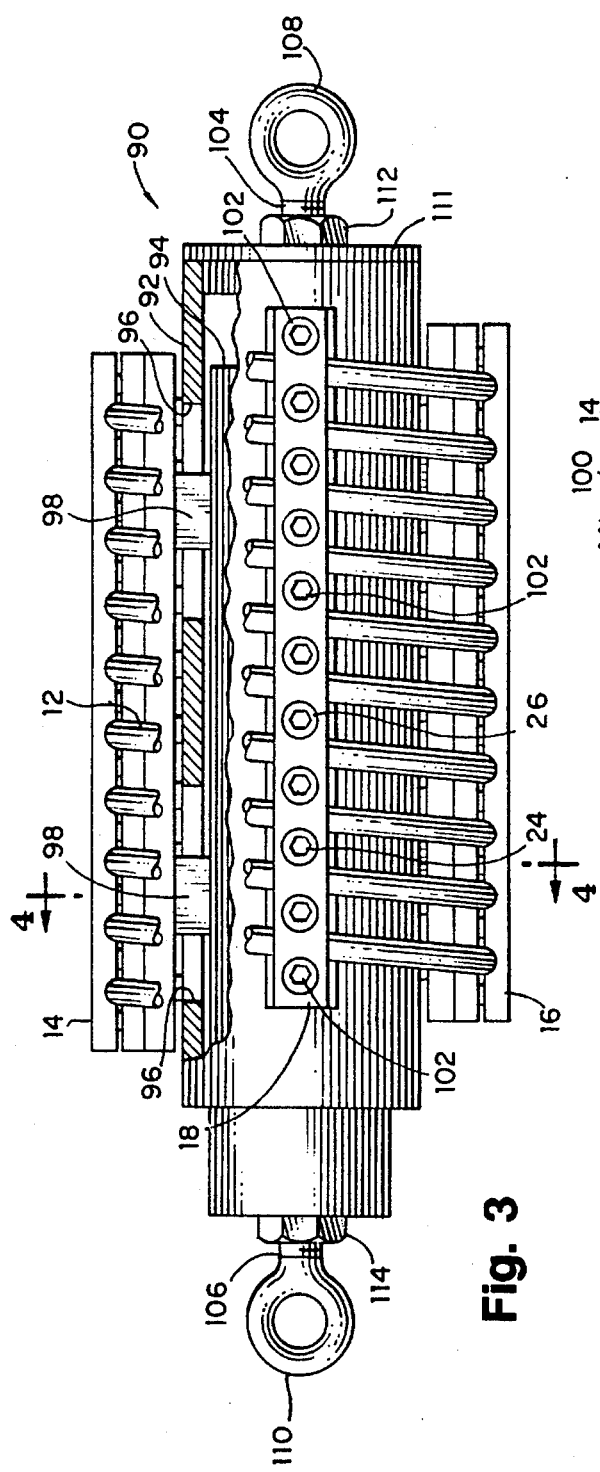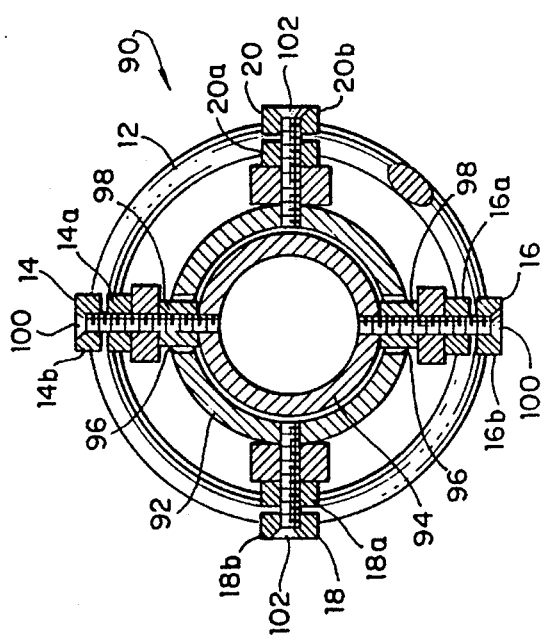

WIRE CABLE ISOLATOR AND ENERGY ABSORBING RESTRAINT

CROSS REFERENCE TO RELATED APPLICATIONS

This application is a division of application Ser. No. 08/274,645 filed Jul. 13, 1994, now U.S. Pat. No. 5,441,243 which is a continuation-in-part of U.S. patent application Ser. No. 07/978,018, filed Nov. 17, 1992, for "Pipe Restraint" now U.S. Pat. No. 5,360,210, which is a continuation-in-part of U.S. patent application Ser. No. 915,477, filed Jul. 16, 1992, for "Pipe Restraint", now U.S. Pat. No. 5,240,232.

TECHNICAL FIELD

This invention relates to energy absorbing restraining devices which restrain static and dynamic movement in a spring like manner to dampen dynamic movement and more particularly, an isolator for energy absorbing restraining devices which utilize coiled wire cable for restraining such static and dynamic movement.

BACKGROUND OF THE INVENTION

Energy absorbing restraints can be used in a many applications. For example, such restraints are used as restraining devices for process piping to dampen motion of such piping caused by dynamic events such as fluid transients, flow induced steady state vibrations, earthquakes and the like.

Additionally, for thermal considerations, piping systems must be supported to allow expansion due to the thermal growth induced by a hot process fluid flowing therethrough. Design conflicts occur however, where piping system restraints are necessary to limit dynamic displacements at locations along the pipe which also encounter thermal growth.

Traditionally this conflict has been resolved by using snubbers which allow the pipe to freely expand but momentarily restrain the pipe during a dynamic event. Snubbers, however, absorb little energy, must be periodically serviced and have been known to fail, resulting in costly snubber inspection programs, particularly in the nuclear power industry.

Various alternative restraints have been proposed, including gapped restraints and energy absorbers. Gapped restraints allow free thermal travel of the piping system, but limit dynamic travel to the limits of preset travel constraints. One disadvantage of gapped restraints is that they impart high impact loads to the adjoining structure when such a restraint reaches the ends of its travel during a dynamic event.

Several types of energy absorbing restraints are available. One example of an energy absorbing restraint is disclosed in U.S. Pat. No. 4,620,688, to Khlafallah et al., entitled "Energy Absorbing Apparatus For Piping System And The Like", which utilizes steel flex plates which act as a spring. The spring action allows for thermal expansion and also absorbs energy by plastic deformation of the plates during dynamic movement. Such a restraint, however, has a low cycle fatigue life which is a significant drawback.

Another type of energy absorbing restraint is disclosed in U.S. Pat. No. 4,955,467, to Kallenbach, entitled "Energy Damping Device" which discloses a device where energy is absorbed by friction which is generated in a reciprocating piston and cylinder arrangement. A significant drawback to this type of restraint is the large amount of variability in the resulting frictional forces, which provides inconsistent energy absorption.

Still another type of energy absorbing restraint incorporates multi-strand helical cables trapped between plates which function as a spring to allow for thermal expansion. Devices using such an arrangement are disclosed, for example, in U.S. Pat. No. 4,190,227, to Belfield et al., entitled "Vibration Isolator And Method For Manufacturing Same," and U.S. Pat. No. 4,783,038, to Gilbert et al., entitled "Isolator Apparatus."

These devices absorb energy by the rubbing and sliding of cable strands when such strands are subjected to dynamic displacements. The energy absorbing component of such devices is known as a wire rope isolator.

U.S. Pat. No. 5,240,232, to Loziuk, entitled "Pipe Restraint," which patent is commonly assigned herewith, discloses wire rope isolators incorporated into a pin-pin device for connection between, for example, a process pipe and a structure.

That device uses wire rope isolators which trap or clamp the wire cable bights (i.e., coils) at about 180° degrees apart. Such devices, however, typically require centering bushings or slide plates to maintain the moving portions of the device coaxial, one relative with the other.

Accordingly, it is advantageous to have a device which uses wire rope isolators configured so as to eliminate the need for centering bushings or slide plates, which device maintains the moving portions of the device coaxial, one relative with the other.

SUMMARY OF THE INVENTION

The present invention provides a wire cable isolator that connects to and isolates a device from an adjacent structure or support member where the device is subject to movement due to dynamic loads and/or thermal expansion. The isolator is of a simple construction, that provides ease of inspection and minimal maintenance.

The isolator has predetermined, symmetrical force-deflection properties. The wire cable isolator includes first and second pairs of entrapment members and a wire cable formed in a spiral. The cable has at least one bight.

The spiral has an externally unloaded shape which is maintained by the first and second pairs of entrapment members. The first pair of entrapment members clamp the wire cable spiral at opposite side of the wire cable spiral and the second pair of entrapment members clamp the wire cable spiral at opposite side of the wire cable spiral. The first and second pairs of entrapment members are disposed at predetermined positions about an exterior periphery of the spiral.

In a preferred embodiment, the first pair of entrapment members clamp the wire cable spiral at 180° one with the other, and the second pair of entrapment members clamp the wire cable spiral at 180° one with the other. In a most preferred embodiment, the first and second pairs of entrapment members are disposed 90° one with the other.

Preferably, each entrapment member includes an inner clamping plate and an outer clamping plate. Each inner clamping plate is secured to its associated outer clamping plate with the wire cable disposed or captured therebetween.

The isolator may be used in an energy absorbing and displacement limiting device, such as a restraint. Such a restraint is used for connecting an object subject to movement due to dynamic loads and possibly thermal deflection, such as a pipe, and an adjacent structure, such as a building or a support member.

The restraint which incorporates the isolator has symmetrical stiffness properties in both tension and compression, and resists buckling under load.

The restraint includes a first, inner cylinder having an extension tube mounted to one of the ends of the cylinder, and a second, outer hollow cylinder. The second hollow cylinder surrounds the first, inner cylinder. A wire cable isolator is mounted to the inner cylinder by one pair of entrapment members, and is mounted to the outer cylinder by the other pair of entrapment members.

In one embodiment of the restraint, the isolator is mounted in an annulus manner. That is, the isolator is mounted between the inner and outer cylinders. This embodiment may includes viewing ports in the outer cylinder for visually inspecting the isolator in place.

In an alternate embodiment, the isolator is mounted external of the outer cylinder.

These and other features and advantages of this invention are evident from the following description of the preferred embodiments of this invention with reference to the accompanying drawings.

BRIEF DESCRIPTION OF THE DRAWINGS

FIG. 1 is a side elevational view of a quarter-loop wire cable isolator embodying the principles of the present invention;

FIG. 1a is a front elevational view of the quarter-loop wire cable isolator of FIG. 1;

FIG. 2 is a side elevational view of an embodiment of a restraint device, with a portion thereof broken-away, illustrating a quarter-loop isolator of the present invention assembled within the annulus of two telescoping, coaxial cylinders;

FIG. 3 is a side elevational view of another embodiment of a restraint device, with a portion thereof broken-away, illustrating a quarter-loop isolator of the present invention assembled about two telescoping, coaxial cylinders;

FIG. 4 is a cross-sectional view of the restraint device taken along line 4—4 of FIG. 3 in the direction indicated;

DESCRIPTION OF THE PREFERRED EMBODIMENTS

Figure 5:
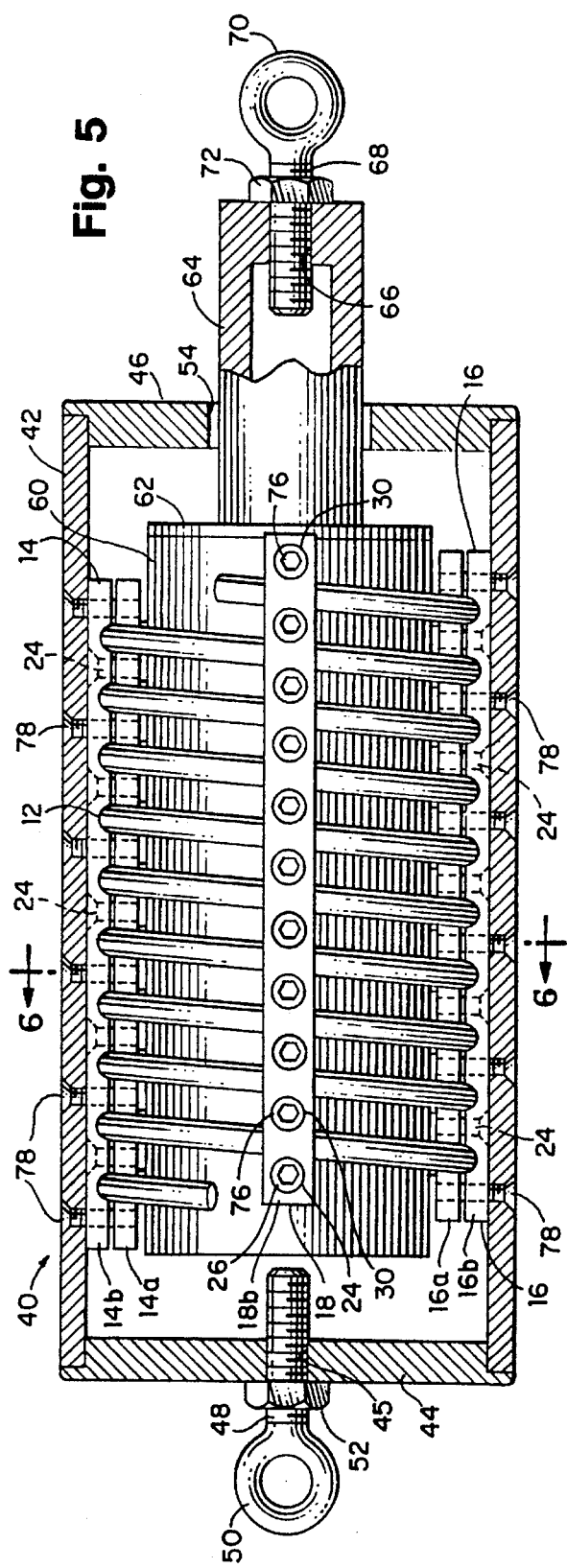
FIG. 5 is a cross-sectional view of the restraint of FIG. 2 with a portion thereof broken away.

While the present invention is susceptible of embodiment in various forms, there is shown in the drawings, and will hereinafter be described, presently preferred embodiments with the understanding that the present disclosure is to be considered an exemplification of the invention and is not intended to limit the invention to the specific embodiments illustrated.

With reference now to the figures, and particularly to FIGS. 1 and 2, there is shown a quarter-loop wire rope or wire cable isolator 10 of the present invention. The isolator includes a wire cable 12 which is formed in a spiral, having a generally circular or near circular shape. It is to be understood, however, that the wire cable 12 can be formed in a variety of shapes, such as an ellipse or the like, without departing from the teachings of the present invention.

The wire cable 12 preferably is formed of individual strands of wire, which are twisted to form the wire cable 12. The wire cable 12 has a predetermined gauge or diameter, discussed in detail herein.

Wire cable is typically formed of single wires which are wound or twisted together to form a cable strand, and a group of cable strands which are wound or twisted together to form a wire cable. Reference herein to the wire cable count is to the total number of wires in the wire cable. Reference to the wire strand wind is to the number of wires in each cable strand and the number of cable stands forming the cable.

For example, a wire cable that has a wire strand wind of 7×7 is formed of 7 cable strands, each strand being formed of 7 wires. The count, or total number of wires forming the cable, of such a 7×7 wire cable is 49.

As FIGS. 1 and 2 illustrate, the isolator further includes a first pair of entrapment members 14, 16, and a second pair of entrapment members 18, 20. Each entrapment member 14, 16, 18, 20, includes a respective inner clamping plate 14a, 16a, 18a, 20a, and a respective outer clamping plate 14b, 16b, 18b, 20b.

The first pair of entrapment members 14, 16, clamp or capture the wire cable 12 at opposite sides of the spiral, and the second pair of entrapment members 18, 20, clamp or capture the wire cable 12 at opposite sides of the spiral. Preferably, entrapment members 14, 16 clamp the spiral at 180° one with the other, and entrapment members 18, 20, clamp the spiral at 180° one with the other.

The first pair of entrapment members 14, 16, and the second pair of entrapment members 18, 20, are disposed at predetermined positions about an exterior periphery of the spiral. Preferably, the first pair of entrapment members 14, 16, and the second pair of entrapment members 18, 20, are disposed 90° one with the other.

As best seen in FIG. 1 with reference to the first pair of entrapment members 14, 16, each of the clamping plates 14a,b, 16a,b, 18a,b, 20a,b, has a plurality of semicircular notches 22 formed laterally therein for receipt of the wire cable 12. The notches 22 of each of the inner clamping plates 14a–20a, are aligned with the associated notches 22 of its respective outer clamping plate 14b–20b. This arrangement forms a generally circular bore through the plates 14a, b–20a,b, for receiving and securing, or capturing, the wire cable 12.

The inner plates 14a–20a, and outer plates 14b–20b are secured together with suitable fasteners, such as with threaded bolts 24. The bolts 24 extend through bores 26 in the respective outer plates 14b–20b, and engage threaded bores 28 in the respective inner plates 14a–20a. Additional mounting bores 30 are provided at locations along the entrapment members 14, 16, 18, 20, as will be further discussed herein.

The isolator 10 exhibits certain force-deflection properties or "stiffness". That is, as forces are placed on the isolator 10 in various directions, the wire cable 12 deflects and exhibits it own responsive forces.

The force deflection properties of the isolator 10 are a function of the specific configuration of the isolator 10 and the type and size of wire cable 12 used. Some of the design considerations for the cable 12 include the material, size and thickness of the wire cable 12. Design considerations for the isolator 10 include the pitch of the loops (i.e., the angle of the cable relative to the longitudinal axis of the isolator 10) of the spiral of cable 12, the loop diameter, and the number of loops (or bights) in the isolator 10.

As will be recognized by those skilled in the art, given the combinations possible in the design of the isolator 10 and the cable 12, the isolator 10 can be used in a wide range of situations where dynamic loads must be accommodated in particular systems designs. Such systems may include piping systems and mounting/isolation systems for devices such as electronic devices.

Figure 6:
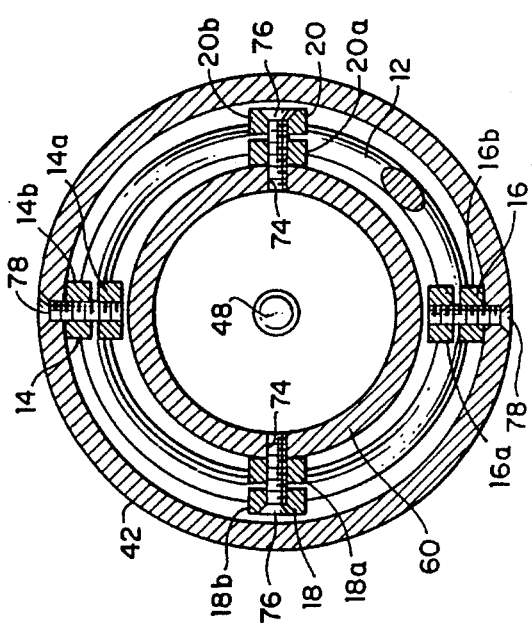
FIG. 6 is a cross-sectional view of the restraint device taken along line 6—6 of FIG. 5 in the direction indicated.

One device in which the isolator 10 of the present invention is used is an annulus-mounted, pin-pin type of pipe restraint 40 as shown in FIGS. 2, 5 and 6. The annulus-mounted restraint 40 includes an outer, hollow cylinder 42, an inner cylinder 60 assembled in a telescopic manner, and an isolator 10 disposed therebetween.

The outer, hollow cylinder 42 includes a pair of end caps 44, 46 at either end of the cylinder 42. The end cap 44 has a threaded bore 45 therethrough for receiving a threaded rod 48 that may include an enclosed rod end 50 for securing the restraint 40 to a structure or to a pipe or the like. A threaded jam nut 52 may also be provided to prevent the rod 48 from disengaging from the end cap 44.

The opposing end cap 46 has a bore 54, generally centrally therethrough. The end caps 44, 46, may be sealed to the outer cylinder 42 in any suitable manner, as by welding, by threaded connection, or by fasteners (not shown).

The outer cylinder 42 also includes mounting holes 56 positioned along its length at locations which align with the mounting bores 30 of the isolator 10. The outer cylinder 42 may also include inspection ports 58 positioned along its length for visually inspecting the isolator 10.

The inner cylinder 60 is disposed within the interior of, and coaxial with, the outer cylinder 42. The inner cylinder 60 preferably is hollow to minimize the weight of the restraint 10.

The inner cylinder 60 includes an end cap 62 and an extension tube 64 extending therefrom. When the inner cylinder 60 is mounted coaxially in the outer cylinder 42, the extension tube 64 extends through the bore 54 in the end cap 46.

The extension tube 64 includes a threaded bore 66 at one end, which thread is opposite that of the thread in bore 45 of end cap 44. The opposing threads allow the restraint to be fitted in place, by turning, similar to the fitting of a turnbuckle.

The restraint 40 includes a threaded rod 68 which threadedly engages extension tube 64. The rod 68 may include an enclosed end 70 and a jam nut 72 to prevent the rod 68 from disengaging from the threaded bore 66.

The inner cylinder 60 further includes mounting bores 74 therein for mounting the isolator 10 thereto.

In order to prevent the wire bights from excessive displacement, the end caps 44, 46, provide internal stops to the restraint 40.

In assembling the restraint 40, an appropriate isolator 10 is chosen into which the inner cylinder 60 is placed. To mount the cylinder 60 to the isolator 10, two opposing entrapment members, such as the first pair 14, 16, are bolted to the cylinder 60 using suitable fasteners such as the bolts 76, which engage the mounting bores 30.

The inner cylinder 60, extension tube 64, and the isolator 10 then are placed into the outer cylinder 42, with the extension tube 64 extending through bore 54. The isolator 10 then is mounted to the outer cylinder 42 by the second pair of entrapment members 18, 20, which are at a predetermined position about an exterior periphery of the spiral. Preferably, the first pair of entrapment members 14, 16, and the second pair of entrapment members 18, 20, are 90° apart one from the other. In the present example where the entrapment members 14, 16, are mounted to the inner cylinder 60, the entrapment members 18, 20, are mounted to the outer cylinder 42. The isolator 10 is mounted to the outer cylinder using suitable fasteners such as the bolts 78.

The threaded rods 48, 68, and as necessary the jam nuts 52, 72, are then assembled to the restraint 40. The restraint 40 can be lengthened or shortened prior to installation to meet the requirements of the particular installation by adjusting the length of the threaded rods 48 external of the restraint 40. Once installed, the restraint load is adjusted by rotating the restraint 40 about its longitudinal axis to threadedly engage the rods 48, 68, in a turnbuckle-like manner.

FIGS. 3 and 5 illustrate an alternate embodiment of a restraint 90 which uses the present quarter-loop isolator 10. The restraint 90 is an externally-mounted, pin-pin type of restraint where the isolator 10 is mounted externally of an outer cylinder 92, which is mounted about or externally of an inner cylinder 94 in a telescopic manner. This configuration allows for ease of inspection of the isolator 10.

The inner cylinder 94 of this embodiment is similar to the inner cylinder of the annulus-mounted configuration of the restraint 40 of FIGS. 2, 5, and 6. The outer cylinder 92 of this embodiment has a pair of channels or openings 96 which extend longitudinally along a portion of the cylinder 92.

The isolator 10 is mounted to the inner cylinder 94 using a pair of extension blocks or spacers 98 which are disposed intermediate the entrapment members (such as the first pair 14, 16) and the body of the cylinder 94. The extension blocks 98 have a thickness at least equal to the thickness of the outer cylinder 92. The isolator 10 is mounted to the inner cylinder 94 using suitable fasteners such as the bolts 100.

The inner cylinder 94 and the isolator 10 then are assembled to the outer cylinder 92. The inner cylinder 92 is disposed in the outer cylinder 92 such that the extension blocks 98 slidably move through the channels 96. This configuration allows the inner cylinder 94 to slidably move back and forth within the outer cylinder 92. The isolator 10 is mounted to the outer cylinder 92 in a suitable manner, such as by the bolts 102.

In order to prevent excessive displacement of the wire bights, internal stops are provided. The internal stops are provided in the compression and tension modes of the restraint 90 by contact between the extension blocks 98 and the channels 96. In addition, in the compression mode, a stop is provided by the end cap 111.

Similar to the annular restraint 40, the externally-mounted restraint 90 includes threaded rods 104, 106, each rod having a closed end 108, 110. The rods 104, 106, may be fitted with jam nuts 112, 114 to prevent the rods 104, 106 from disengaging from the cylinder 92 and the end cap 111, respectively. The externally-mounted restraint 90 is adjustable prior to installation and subsequent thereto by rotating the restraint 90 about its longitudinal axis similar to the adjustment of restraint 40. Either restraint 40, 90 can be preloaded, that is, it can be subjected to a static load, by rotating the restraint 40, 90, in a turnbuckle-like manner after it is installed.

In either embodiment, the restraint 40, 90 is used to control dynamic motion of an object, such as a pipe, in a direction along the central axis of the restraint 40, 90. Movement is controlled by connecting the rod end 50, 108 to the object and connecting the opposing rod end 70, 110 to a structure such as a building or member support.

As the object is displaced, such as by dynamic forces, the inner cylinder 60, 94 moves along its central axis relative to the outer, hollow cylinder 40, 92. This motion is resisted by the spiral of wire cable 12 which is connected to inner cylinder 60, 94 and outer hollow cylinder 40, 92. The stiffness characteristics of the isolator which provide the forces which resist movement are a function of various factors, including the material, size, and thickness of the wire cable 12, and geometric parameters of the isolator including the pitch of the loops of spiral of the cable 12, the loop diameter and number of loops (or bights) in the isolator 10.

As the wire cable 12 is deflected, the individual strands of wire which make up the wire cable 12 bundle rub against each other resulting in frictional hysteresis. Such frictional hysteresis results in the dynamic motion of the object being damped out.

The present invention thus provides a spring-dashpot type device which is of simple construction with minimal, if any, maintenance requirements. When necessary to meet the requirements of the particular installation, a restraint may be constructed to allow for visual inspection of the wire cable 12 by providing inspection ports 58 in the outer cylinder 42, such an arrangement being exemplified by the annulus restraint 40, disclosed herein.

Alternately, as exemplified by the externally-mounted restraint 90, the wire cable 12 can be configured about or external to the outer cylinder 92. This configuration provides maximum inspection capabilities of the wire cable 12. In either embodiment 40, 90, protection of the energy absorbing wire cable 12 is afforded by limiting the deflection to which the cable 12 may be subjected.

It is to be noted that the present restraints use telescoping, coaxial cylinders. This configuration provides for efficient use of the structural members when the restraints are loaded in axial compression. Other configurations, however, may also be used.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. An energy absorbing and displacement limiting device of simple construction, ease of inspection and minimal maintenance, said device for connecting an object subject to movement due to dynamic loads, and an adjacent structure, the device having symmetrical stiffness properties in both tension and compression which resists buckling under load, the device comprising:

a first, inner cylinder having first and second ends a second, outer hollow cylinder having first and second ends, said second hollow cylinder surrounding said first, inner cylinder;

a wire cable isolator including first and second pairs of entrapment members, each said entrapment member including an inner clamping plate and an outer clamping plate secured one to the other; and a wire cable formed in a spiral having at least one bight, said spiral having an externally unloaded shape maintained by said first and second pairs of entrapment members, said cable being capture between said inner clamping plate and said outer clamping plate of each entrapment member, said first pair of entrapment members clamping the wire cable spiral at opposite sides of the wire cable spiral, and said second pair of entrapment members clamping the wire cable spiral at opposite sides of the wire cable spiral, said first and second pairs of entrapment members being disposed at predetermined positions about an exterior periphery of said spiral, wherein said first pair of entrapment members is mounted to said first, inner cylinder and second pair of entrapment members is mounted to said second, outer hollow cylinder.

2. The energy absorbing and displacement limiting device of claim 1, wherein said first pair of entrapment members clamp the wire cable spiral at 180° one with the other, and said second pair of entrapment members clamp the wire cable spiral at 180° one with the other, said first and second pairs of entrapment members being disposed 90° one with the other.

3. The energy absorbing and displacement limiting device of claim 1, wherein said wire cable spiral is disposed at least partially between said first and second cylinders.

4. The energy absorbing and displacement limiting device of claim 1 having an extension tube mounted to one of said first and second ends of said first, inner cylinder, and having end caps mounted to the ends of said second, outer hollow cylinder, one of said end caps defining a bore therethrough for receipt of said extension tube, said end caps limiting axial movement of said first, inner cylinder relative to said second, outer cylinder.

5. The energy absorbing and displacement limiting device of claim 4, wherein the other of said end caps of said second cylinder defines a bore therethrough which includes threads therein, the threads being one of left and right hand threads, and wherein said extension tube includes threads, the threads being opposite the threads in said end cap, said threads cooperating to adjustably, axially move said first cylinder relative to said second cylinder in a turnbuckle-like adjustment configuration.

6. The energy absorbing and displacement limiting device of claim 1, wherein said first cylinder and said second cylinder are in coaxial alignment when in an unloaded condition.

7. The energy absorbing and displacement limiting device of claim 1 in which said second hollow cylinder includes viewing ports therein.

8. The energy absorbing and displacement limiting device of claim 1 wherein said wire cable spiral is disposed external to said first and second cylinders.

9. The energy absorbing and displacement limiting device of claim 1, wherein said first, inner cylinder is hollow, and said wire cable spiral is disposed internal to said first cylinder.

10. The energy absorbing and displacement limiting device of claim 8, wherein said second, outer cylinder includes at least one channel formed longitudinally therein and said first, inner cylinder includes at least one extension block mounted thereto movable within said channel, and wherein displacement of said wire cable isolator is limited by contact between said at least one extension block and said at least one channel.

11. An energy absorbing and displacement limiting device of simple construction, ease of inspection and minimal maintenance, said device for connecting an object subject to movement due to dynamic loads, and an adjacent structure, the device having symmetrical stiffness properties in both tension and compression which resists buckling under load, the device comprising:

a first, inner cylinder having first and second ends;

a second, outer hollow cylinder having first and second ends, said second hollow cylinder surrounding said first, inner cylinder;

a wire cable isolator including first and second pairs of entrapment members; and a wire cable formed in a spiral having at least one bight, said spiral having an externally unloaded shape maintained by said first and second pairs of entrapment members, said entrapment members of said first and second pairs of entrapment members clamping the wire cable spiral at at least four predetermined spaced positions about an exterior circumferential periphery of said spiral, wherein said first pair of entrapment members is mounted to said first, inner cylinder and second pair of entrapment members is mounted to said second, outer hollow cylinder.

12. The energy absorbing and displacement limiting device elf claim 11, wherein said first pair of entrapment members clamp the wire cable spiral at 180° one with the other, and said second pair of entrapment members clamp the wire cable spiral at 180° one with the other, said first and second pairs of entrapment members being disposed 90° one with the other.

13. The energy absorbing and displacement limiting device of claim 11, wherein said wire cable spiral is disposed at least partially between said first and second cylinders.

14. The energy absorbing and displacement limiting device of claim 11 having an extension tube mounted to one of said first and second ends of said first, inner cylinder and having end caps mounted to the ends of said second, outer hollow cylinder, one of said end caps defining a bore therethrough for receipt of said extension tube, said end caps limiting axial movement: of said first, inner cylinder relative to said second, outer cylinder.

15. The energy absorbing and displacement limiting device of claim 14, wherein the other of said end caps of said second cylinder defines a bore therethrough which includes threads therein, the threads being one of left and right hand threads, wherein said extension tube includes threads, the threads being opposite the threads in said end cap, said threads cooperating to adjustably, axially move said first cylinder relative to said second cylinder in a turnbuckle-like adjustment configuration.

16. The energy absorbing and displacement limiting device of claim 11, wherein said first cylinder and said second cylinder are in coaxial alignment when in an unloaded condition.

17. The energy absorbing and displacement limiting device of claim 11 in which said second hollow cylinder includes viewing ports therein.

18. The energy absorbing and displacement limiting device of claim 11 wherein said wire cable spiral is disposed external to said first and second cylinders.

19. The energy absorbing and displacement limiting device of claim 11, wherein said first, inner cylinder is hollow, and said wire cable spiral is disposed internal to said first cylinder.

20. The energy absorbing and displacement limiting device of claim 18, wherein said second, outer cylinder includes displacement of said wire cable isolator is limited by contact between said at least one extension block and said at least one channel.

21. An energy absorbing and displacement limiting device of simple construction, ease of inspection and minimal maintenance, said device for connecting an object subject to movement due to dynamic loads, and an adjacent structure, the device having symmetrical stiffness properties in both tension and compression which resists buckling under load, the device comprising:

first and second elongated, telescopic members; and a wire cable isolator including first and second pairs of entrapment members and a wire cable formed in a spiral having at least one bight, said spiral having an externally unloaded shape maintained by said first and second pairs of entrapment members, said entrapment members of said first and second pairs of entrapment members clamping the wire cable spiral at least four predetermined spaced positions about an exterior circumferential periphery of said spiral, wherein said first pair of entrapment members is mounted to one of said first and second telescopic members and said second pair of entrapment members is mounted to another of said first and second telescopic members.

* * * * *

UNITED STATES PATENT AND TRADEMARK OFFICE
CERTIFICATE OF CORRECTION

PATENT NO. : 5,522,585
DATED : June 4, 1996
INVENTOR(S) : Lawrence A. Loziuk

It is certified that error appears in the above-indentified patent and that said Letters Patent is hereby corrected as shown below:

Col. 7, line 52, after "ends" insert --;--;

Col. 9, line 19, change "elf" to --of--;

Col.9, line 34, after "movement" delete --:--;

Col. 10, line 34, after "at" insert --at--.

Signed and Sealed this

Twenty-seventh Day of August, 1996

Attest:

BRUCE LEHMAN

Attesting Officer     Commissioner of Patents and Trademarks